Dec. 20, 1966 L. J. ARP ETAL 3,292,824
FLUID METERING AND DELIVERING DEVICE
Filed March 19, 1965 2 Sheets-Sheet 1

INVENTORS
LEON J. ARP
JAMES M. VARNUM
BY
Robert Henderson
ATTORNEY

Dec. 20, 1966     L. J. ARP ETAL     3,292,824
FLUID METERING AND DELIVERING DEVICE
Filed March 19, 1965     2 Sheets-Sheet 2

INVENTORS
LEON J. ARP
JAMES M. VARNUM
By
R. Robert Henderson
ATTORNEY ered # United States Patent Office 3,292,824
Patented Dec. 20, 1966

3,292,824
FLUID METERING AND DELIVERING DEVICE
Leon J. Arp, 1221 Marston, and James M. Varnum,
428 Ash, both of Ames, Iowa 50300
Filed Mar. 19, 1965, Ser. No. 441,107
5 Claims. (Cl. 222—250)

This invention relates generally to a fluid delivery device, and more particularly to a device for precisely metering and delivering a predetermined volume of fluid.

It is an object of this invention to provide a novel device for delivering a certain volume of fluid, which device utilizes the fluid which it delivers as a means of effecting the delivery.

It is another object of this invention to provide a novel device for connection to either a machine capable of delivering fluid until a certain pressure is built up thereby, or to a machine capable of delivering fluid at a certain rate, whereby both fluid delivery machines are converted to delivering a precise volume of the fluid.

Yet another object of this invention is the provision of a novel device for delivering a precise volume of fluid by mounting a free floating piston in a cylinder, and attaching fluid supply and discharge conduits to the cylinder, where by a system of valving fluid delivered to the cylinder is capable of actuating the piston to discharge a predetermined volume therefrom, and where the volume discharged can be easily varied, and further wherein movement of the piston effects control of the valving system.

Still another object of this invention is the provision of a fluid device capable of attaining the above identified objectives, and which is economical to manufacture, extremely simple in structure, uses a minimum of movable parts, and is effective in operation.

These objects, and other features and advantages of this invention will become readily apparent upon reference to the following description when taken in conjunction with the accompanying drawings, wherein.

Figure 1:
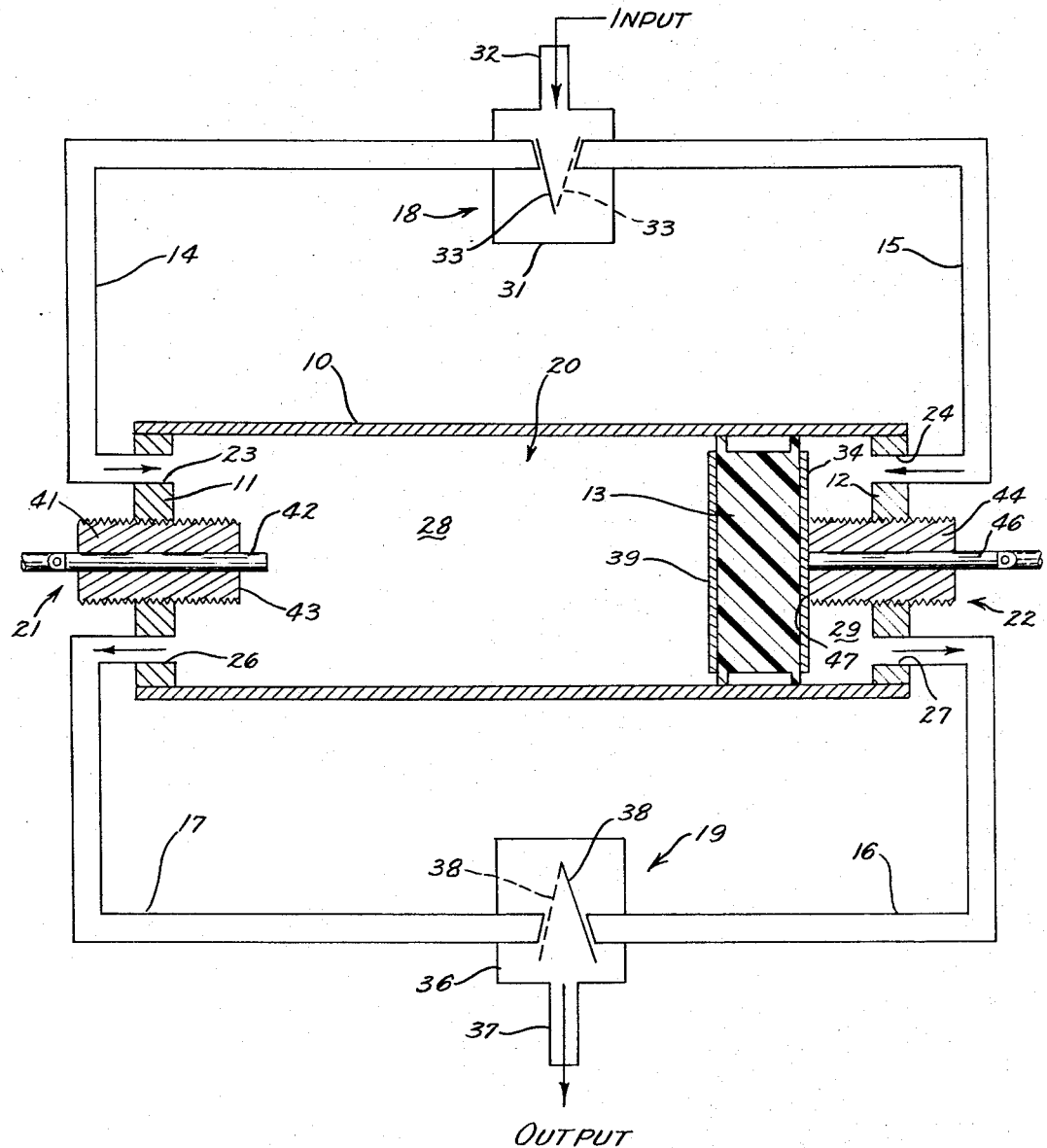
FIG. 1 shows a cross sectional view of the fluid container of this invention as taken along the longitudinal axis thereof, and showing the container schematically connected with fluid conduits and valves.

Referring now to the drawing, the fluid delivery device of this invention comprises an elongated, tubular container 10 having end panels 11 and 12 and within which a piston 13 is freely mounted for longitudinal, reciprocal movement. The device includes further a quartet of fluid transmitting lines 14, 15, 16, and 17 extending between the container 10 and a pair of valve units, indicated generally at 18 and 19. The device is completed, generally, by a pair of valve actuating units indicated generally at 21 and 22, and operable in response to engagement by the piston 13 to control the valve units 18 and 19.

More particularly, the container 10 is a cylindrical, thin wall structure having a constant diameter throughout its entire length, and forming a fluid chamber within its interior. The chamber is indicated generally at 20. A pair of ports 23 and 24 are formed in the respective end panels 11 and 12, with the ports placing the chamber 20 in fluid communication with the conduits 14 and 15, respectively. Also, a pair of passages 26 and 27 are formed in the respective end panels 11 and 12, with the passages fluidly communicating the chamber 20 with the conduits 17 and 16, respectively.

The piston 13 is also circular to provide a sliding, fluid tight fit within the container 10, and is reciprocal from one end of the chamber 20 to the other. It will be noted that the piston 13 floats freely within the chamber 20, the weight of the piston 13 being reduced by the use, for example, of Teflon for the body thereof. The piston divides the chamber 20 into a pair of sub-chambers 28 and 29, the sizes of which are expansible depending on the position of the piston. The import of this will be seen hereinafter.

The valve unit 18 may comprise, for example, a fluid tight housing 31 into which the fluid conduits 14 and 15 extend, and which housing has a nipple 32 through which a fluid may be transmitted in to the housing. To control the passage of the fluid through the conduits 14 and 15, so that when one is closed, the other is open, and vice versa, a valve 33 is pivotally mounted within the housing 31. The valve 33 is shown in full line, closing conduit 14 and port 23, while conduit 15 and port 24 are open for the passage of fluid from the nipple 32 into the sub-chamber 29 and against the face 34 of the piston 13 adjacent thereto. Conversely, in the other, dotted line position of the valve 33, the conduit 15 and port 24 are closed, and the conduit 14 and port 23 open.

The valve unit 19 is identical to valve unit 18, comprising a fluid tight housing 36 containing the outer ends of the conduits 16 and 17, having a nipple 37 through which fluid is discharged, and including a pivotally mounted valve 38 for closing off either conduit and their respective end panel passages. Thus, when the valve 38 is in the full line position, conduit 16 and passage 27 are closed to the passage of the fluid therethrough, whereas conduit 17 and passage 26 are open to enable the fluid from chamber 28, defined by the face 39 of the piston 13 and the end panel 11, to be discharged therethrough. Movement of the valve 38 to the opposite dotted line position results in the obvious opposite conditions.

Referring now to the valve actuating units 21 and 22, the unit 21 comprises an externally threaded block 41 holding a reciprocally movable rod 42. The block 41 is adjustably threaded into an internally threaded bore provided therefor in the end panel 11. The rod 42 is part of a linkage of any conventional arrangement operatively connected to both valves 33 and 38. Thus, for example, upon the actuating rod 42 being engaged by the piston 13, as the rod 42 is moved lengthwise until the piston engages the inner end 43 of the block 41, it operates the linkage (not shown) to move both valves from their full line positions to their dotted line positions.

Similarly, the valve actuating unit 22 comprises an externally threaded block 44 threaded into the opposite end panel 12, and also holding a reciprocally movable rod 46 therein. The rod 46 is also operatively connected by a linkage (not shown) to both valves 33 and 38 for simultaneous movement thereof. In the position of the piston 13 as illustrated, wherein it is engaged with the inner end 47 of the block 44, the actuating rod 46 has been moved such that the valves 33 and 38 were moved to the full line positions as illustrated, the movement being from the dotted line positions as the valves 33 and 38 are only two position valves.

Figure 2:
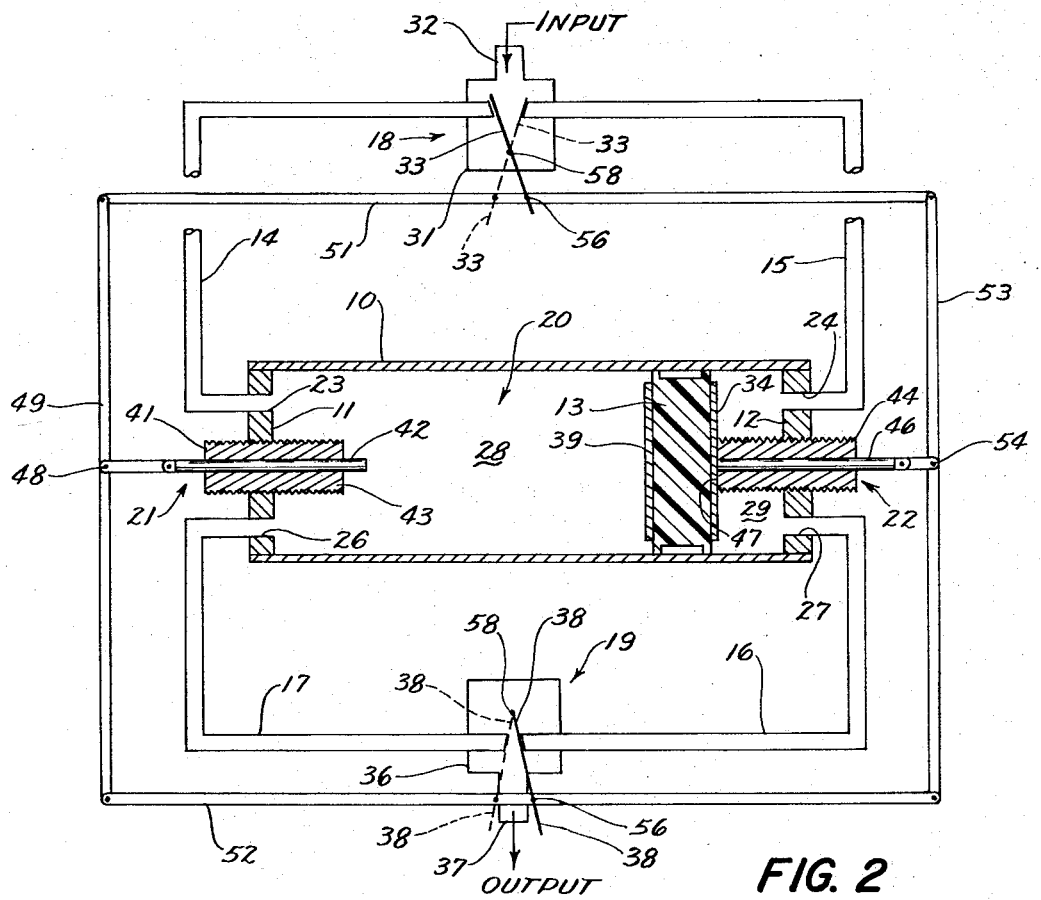
FIG. 2 shows a linkage arrangement for connecting the container rods to the valves.
Figure 3:
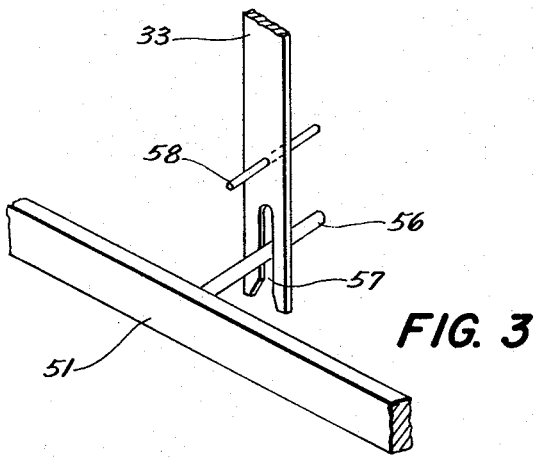
FIG. 3 is an enlarged, fragmentary perspective view showing the connection of part of the linkage with a valve.

In FIGS. 2 and 3, a specific example of one type of linkage for interconnecting each rod 42 and 46 with both valves 33 and 38 for operation thereof as described hereinbefore is shown. The rod 42 is operably connected at joint 48 to a link 49 at each end of which is connected a pair of parallel lever arms 51 and 52. The other ends of the arms 51 and 52 are connected to the opposite ends of another link 53, the latter being connected intermediate its ends to the other rod 46, via a joint 54.

At the center of each lever arm 51 and 52, a pin 56 (FIG. 3) extends for operative engagement with a respective valve 33 and 38 (FIG. 2), each valve being provided with a slot 57 (FIG. 3) therein, whereby linear motion of the lever arms 51 and 52 effects pivotal movement of the valves about their pivot points 58 to provide a simultaneous opening and closing of the respective fluid lines as described hereinbefore.

It may be readily realized that the relative adjusted positions of the blocks 41 and 44 determine the size of the two subchambers 28 and 29. Thus, by providing a fine adjustment of either of the blocks, the area of each subchamber, and thus the volume of fluid dischargeable therefrom can be precisely determined and maintained.

In operation, assume the piston 13 and the valves 33 and 38 are in the full line positions illustrated, with the subchamber 28 filled with a volume of a fluid, the volume of which is in direct relation to the area of the subchamber 28. Delivery of the same fluid into the inlet housing 31 results in the fluid being transmitted through the open conduit 15 and port 24 into the subchamber 29. This fluid, being under sufficient pressure to overcome the static pressure of the same fluid within the subchamber 28, impinges upon the face 34 of the piston 13 sufficient to force the piston 13 away from the port 24 and the end panel 12 toward the opposite end panel 11.

As the piston 13 is moved to the left, then, as illustrated in the figure, the fluid within the subchamber 28 is forced outwardly through the open passage 26 and conduit 17 to the valve unit 19. It will be noted that the passage 23 and conduit 14 are closed by the valve 33. The valve 38, however, is open to the conduit 17 enabling the fluid to pass through the valve unit housing 36 and the nipple 37 to whatever system is attached to the nipple 37 for use of the fluid.

It will have been noted that the fluid in the now expanding subchamber 29 fills that subchamber when the piston 13 is stopped by the block 41 after engaging and moving the rod 42. It is here assumed that the volume of the conduits is always constant and therefore can be disregarded. Thus, when the piston 13 stops and the movement of the rod 42 effects a closing of the valve 33 relative to the conduit 15 and an opening of the valve 38 relative to the conduit 16, the volume of the fluid in the subchamber 29 is known precisely.

Then, upon an additional flow of the fluid through the housing 31, the conduit 14, and the port 23 against the adjacent face 39 of the piston 13, as the conduits 17 and 15 are closed off, the precisely known volume of fluid in subchamber 29 is expelled through the passage 27, the conduit 16, and the nipple 37. This occurs until the piston 13 engages and moves the rod 46 until the piston 13 is stopped by the inner end 47 of the block 44. The movement of the rod 46 as described hereinbefore, results in both valves 33 and 38 returning to their full line positions.

It will be noted that although not shown, means for biasing both rods 42 and 46 inwardly toward each other to an inwardly extending position is provided. The position of rod 42 best illustrates this biased position.

The use of the device 10 has now been described as basically a means of precisely metering and delivering small volumes of fluids. One specific use to which the device has actually been put is as a supplemental attachment to a respirator machine of the patient cycled, positive pressure type. This commercially available machine delivers to the patient an unmeasured amount of a gas, the amount determined by a positive pressure setting.

Thus, should a setting for example of thirty centimeters of $H_2O$ be had, the gas would be forced into the lungs of the patient until the pressure reached the setting, whereupon the machine would stop the flow of fluid. The device for stopping the flow is the previously set pressure detector of the machine.

Assume the present device 10 is interposed between the conventional machine and the patient, with the device 10 in the condition illustrated. Due to an operative triggering of the machine in response to an inhalation by the patient, gas is supplied to the device 10, it being assumed that the same gas is in the subchamber 28 and conduits pertinent thereto. Movement of the piston 13 would then result in a discharge of the certain, specific volume of the gas to the patient.

The piston 13, upon reaching its end of travel creates a back pressure in the conduit 15 and the housing 31 sufficient to stop the machine. Thus the machine would not again function until triggered by the patient. It must be noted that movement of the rods 42 and 46 could be used to accomplish many functions. For example, to insure that the back pressure was quickly reached, whereas the movement of the rod 42 shifted the valve 33 to the dotted line position, the rod 42 movement could momentarily close off the nipple 37, or for that matter close off the nipple 32. The particular arrangement of the valving and the linkage therefor for effecting a particular use of the device 10 is believed quite within the normal skill of the expert in this field.

Although a preferred embodiment of this invention has been disclosed and described herein, it is to be remembered that various modifications and alternate constructions can be made thereto without departing from the true spirit and scope of the invention as defined in the appended claims.

We claim:
1. A device for precisely metering and delivering a predetermined volume of fluid comprising:
   a tubular container including opposite ends and having a chamber formed between said ends for holding a fluid, said container having at least one port formed therein at each end for the entry of fluid therethrough into said chamber, and having further at least one passage formed therein at each end for the discharge of fluid from said chamber;
   first means operably connected to said container and including a rod adjustably inserted into said chamber at one end thereof for movement axially of said container, said first means operable to open one of said ports and simultaneously to close one of said passages;
   second means operably connected to said container and including a rod adjustably inserted into said chamber at the opposite end thereof for movement axially of said container, said second means operable to open the other one of said ports and simultaneously to close the other one of said passages; and
   a piston freely mounted in said chamber and having a sliding, fluid tight fit within said container, said piston forming on each side thereof a pair of expansible subchambers the area of which is determined by the position of the said first or second means extended therein, said piston movable in either direction within said chamber in response to the pressure of a fluid through either port and into one subchamber whereby to force a fluid in the other subchamber out through the passage therefor;
   said piston engageable at said one end of said chamber with said first means rod to effect operation of said first means prior to continued movement of said piston toward said chamber one end, and engageable at said opposite end of said chamber with said second means rod to effect operation of said second means prior to continued movement of said piston toward said chamber opposite end, respective operation of either said first means and said second means being proportional to the respective position of said piston and said rod engaged thereby, whereby the entry of fluid into one sub-chamber and the discharge of fluid from the opposite sub-chamber is progressively decreased as said piston continues to move into engagement with a respective container end and after engagement of said piston with a respective rod.

2. A device for precisely metering and delivering a predetermined volume of a compressible fluid comprising:
   a container including opposite ends and having a chamber formed between said ends for holding a fluid, said container having at least one port formed therein at each end for the entry of fluid therethrough into said chamber, and having further at least one passage formed therein at each end for the discharge of fluid from said chamber;

first valve means operably connected to said ports and movable from one position where one port is open and the other port is closed, to another position where the other port is open and the one port is closed;

second valve means operably connected to said passages and movable from one position where one passage is open and the other passage is closed, to another position where the other passage is open and the one passage is closed;

first control means movably connected to said container at one end and operable when movably actuated to move said first valve means to one of said positions and to move said second valve means to one of said positions, said first control means protruding axially from said container one end;

second control means movably connected to said container at the opposite end and operable when movably actuated to move said first valve means to the other of said positions and to move said second valve means to the other of said positions, said second control means protruding axially from said container opposite end; and a piston freely mounted in said chamber and having a sliding, fluid tight fit within said container, said piston forming on each side thereof a pair of expansible subchambers the area of which is determined by the position of the said first or second means extended therein, said piston movable in either direction within said chamber in response to the pressure of a fluid through either port and into one subchamber whereby to force a fluid in the other subchamber out through the passage therefor;

said piston engageable at said one end of said chamber with said first control means to effect operation thereof, and engageable at said opposite end of said chamber with said second control means to effect operation therefor, said piston engageable at either end of said chamber with a respective control means whereby to move said respective control means during continued movement of said piston toward the respective container end, said first and second valve means operable in proportion to the position of said piston relative to a respective control means engaged thereby and in response to continued movement of said piston to progressively reduce the respective flow of the fluid into and out of said sub-chambers to reduce the speed of said piston as it continues to move.

3. A device for precisely metering and delivering a predetermined volume of fluid as defined in claim 2, and further wherein said first control means and said second control means both include an element inserted into said chamber, the extent of the insertion adjustable, and which elements each are actuable to operate the respective control means of which it is a part, said actuation being responsive to engagement thereof by said piston.

4. A device for precisely metering and delivering a predetermined volume of fluid comprising:

a tubular container including opposite ends and having a chamber formed between said ends for holding a fluid, said container having at least one port formed therein at each end for the entry of fluid therethrough into said chamber, and having further at least one passage formed therein at each end for the discharge of fluid from said chamber;

valve means operable to simultaneously open one of said ports and to close one of said passages;

first means operably connected to said container and including a first rod adjustably inserted into said chamber at one end thereof for movement axially of said container, and including further first linkage structure interconnecting said first rod and said valve means for operating said valve means in response to movement of said first rod;

second means operably connected to said container and including a second rod adjustably inserted into said chamber at an opposite end thereof for movement axially of said container, and including further second linkage structure interconnecting said second rod and said valve means for operating said valve means in response to movement of said second rod; and a piston freely mounted in said chamber and having a sliding, fluid tight fit within said container, said piston forming on each side thereof a pair of expansible sub-chambers the area of which is determined by the position of the said first or second means extended therein, said piston movable in either direction within said chamber in response to the pressure of a fluid through either port and into one sub-chamber whereby to force a fluid in the other sub-chamber out through the passage therefor;

said piston engageable at said one end of said chamber with said first means rod to effect operation of said first means prior to continued movement of said piston toward said chamber one end, and engageable at said opposite end of said chamber with said second means rod to effect operation of said second means prior to continued movement of said piston toward said chamber opposite end, said first means and said second means each having sufficient resistance to engagement of their respective rod by said piston to partially absorb the momentum of said piston, whereby operation of either first means and said second means is initiated and simultaneously the piston is slowed down subsequent to engagement of said piston with a respective rod.

5. A device for precisely metering and delivering a predetermined volume of fluid as defined in claim 4, and further wherein operation of said valve means in response to movement of either said first rod and said second rod progressively reduces the respective flow of fluid into and out of said subchambers to reduce the speed of said piston as it continues to move.

References Cited by the Examiner
UNITED STATES PATENTS

| 801,612 | 11/1905 | Schramm | 103—52 X |
|---|---|---|---|
| 874,565 | 12/1907 | Bristow | 222—249 X |
| 1,482,467 | 2/1924 | Harrington | 222—250 X |
| 2,576,747 | 11/1951 | Bryant | 222—250 |
| 2,772,664 | 12/1956 | Jones et al. | 73—239 |
| 2,826,342 | 3/1958 | Clark et al. | 222—250 X |
| 2,882,999 | 4/1959 | Morgan | 222—249 X |

ROBERT B. REEVES, *Primary Examiner.*

HADD S. LANE, *Examiner.*

N. L. STACK, *Assistant Examiner.*